(12) United States Patent
Ding et al.

(10) Patent No.: US 11,016,595 B1
(45) Date of Patent: May 25, 2021

(54) FILM SENSOR AND TOUCH DISPLAY INCLUDING THE SAME

(71) Applicant: TPK Advanced Solutions Inc., Fujian (CN)

(72) Inventors: Zi Jun Ding, Xiaochang County (CN); Huang Chen, Xiamen (CN); Yun Guo Xu, Fuzhou (CN); Li Huang Tsai, Miaoli County (TW); Li De Lv, Xiamen (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 16/939,173

(22) Filed: Jul. 27, 2020

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 2203/04103* (2013.01); *G06F 2203/04112* (2013.01)

(58) Field of Classification Search
CPC ................ G06F 3/0446; G06F 3/0443; G06F 2203/04103; G06F 3/0412; G06F 2203/04112; G06F 2203/04111; G06F 3/047; G06F 1/1643; G06F 2203/04104; G06F 3/0488; H01L 27/323; G02F 1/13338
See application file for complete search history.

*Primary Examiner* — Sanjiv D. Patel
(74) *Attorney, Agent, or Firm* — Cooper Legal Group, LLC

(57) ABSTRACT

A film sensor includes a substrate, a metal nanowire layer, and an optical adhesive layer. The metal nanowire layer is formed on the substrate and includes a plurality of electrode wires spaced apart from one another. The optical adhesive layer is formed on the metal nanowire layer and is matched with the metal nanowire layer, such that a line resistance variation of the electrode wires is less than 10% and an insulation resistance between adjacent two of the electrode wires is greater than 300 MΩ under a weathering test conducted at a high temperature of 65° C., a high relative humidity of 90%, and a DC voltage of 5V for 240 hours.

13 Claims, 2 Drawing Sheets

FILM SENSOR AND TOUCH DISPLAY INCLUDING THE SAME

FIELD

The disclosure relates to a film sensor, and more particularly to a film sensor including metal nanowires.

The disclosure also relates to a touch display including the film sensor.

BACKGROUND

In recent years, touch screens have been widely used in a variety of electronic products, especially in mobile communication products. Also, in order to facilitate portability of these products, foldable touch screens have been further developed.

A transparent conductive material commonly used for a display panel is indium tin oxide (ITO). However, a film made of ITO is fragile and is not flexible, such that the application thereof in portable electronic products is limited. Therefore, the development of a flexible and transparent conductive film as an alternative to ITO is one of the key projects in this technical field.

A material alternative to ITO, which has been relatively well developed, is metal nanowires. Conductive circuits can be formed by patterning a coating layer including the metal nanowires, and can be further used to form a film sensor. However, existing film sensors including the metal nanowires are susceptible to open-circuit or short-circuiting of the conductive circuits under certain use conditions, leading to failure of the product functions. Therefore, it is currently a subject of research and development to provide a film sensor including the metal nanowires with improved reliability.

SUMMARY

The disclosure is to provide a film sensor having enhanced reliability.

According to a first aspect of the disclosure, there is provided a film sensor which includes a substrate, a metal nanowire layer, and an optical adhesive layer. The metal nanowire layer is formed on the substrate and includes a plurality of electrode wires spaced apart from one another. The optical adhesive layer is formed on the metal nanowire layer and is matched with the metal nanowire layer, such that a line resistance variation of the electrode wires is less than 10% and an insulation resistance between adjacent two of the electrode wires is greater than 300 MΩ under a weathering test conducted at a high temperature of 65° C., a high relative humidity of 90%, and a DC voltage of 5V for 240 hours.

According to a second aspect of the disclosure, there is provided a touch display which includes a display module and the abovementioned film sensor that is integrated with the display module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
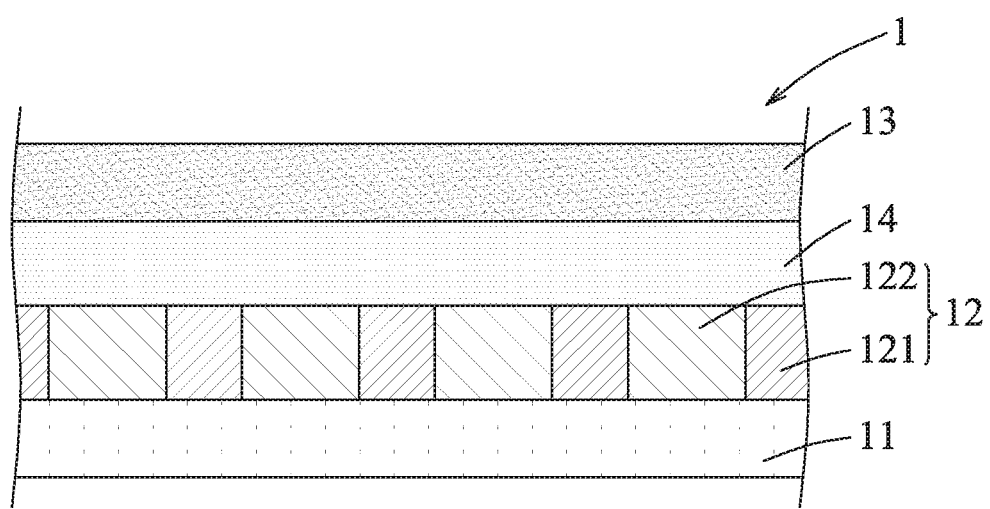
FIG. 1 is a fragmentary schematic sectional view of an embodiment of a film sensor according to the disclosure.

Before the disclosure is described in greater detail, it should be noted that some components are exaggeratedly shown in the figures for the purpose of convenient illustration and are not in scale. The relative terms, such as "above", "below", and the like, may be used herein to describe a relative position, rather than an absolute position, of one element relative to another element as illustrated in the figures. In addition, the term "disposed on" or "formed on" may include a state of being disposed or formed directly on and a state of being disposed, or formed, indirectly on, unless specified otherwise.

A film sensor according to the disclosure includes a substrate, a metal nanowire layer, and an optical adhesive layer. The metal nanowire layer is formed on the substrate and includes a plurality of electrode wires spaced apart from one another. The optical adhesive layer is formed on the metal nanowire layer and is matched with the metal nanowire layer, such that a line resistance variation of the electrode wires is less than 10% and an insulation resistance between adjacent two of the electrode wires is greater than 300 MΩ under a weathering test conducted at a high temperature of 65° C., a high relative humidity of 90%, and a DC voltage of 5V for 240 hours.

In certain embodiments, the optical adhesive layer is made of an optical adhesive material selected from the group consisting of a non-ultraviolet curable acrylic adhesive material, a rubber adhesive material, or a combination thereof. The optical adhesive layer made of the non-ultraviolet curable acrylic adhesive material has a dielectric constant of less than 4 at a frequency of 100 KHz, a water absorption rate of less than 0.3%, and a water vapor transmission rate of less than 400 $g/m^2/day$ at a temperature of 38° C. and a relative humidity of 90%. The optical adhesive layer made of the rubber adhesive material has a dielectric constant of less than 4 at a frequency of 100 KHz, a water absorption rate of less than 0.3%, and a water vapor transmission rate of less than 100 $g/m^2/day$ at a temperature of 38° C. and a relative humidity of 90%.

In certain embodiments, the optical adhesive layer has a thickness ranging from 25 μm to 250 μm.

In certain embodiments, the electrode wires cooperatively define a plurality of receiving spaces thereamong, and the metal nanowire layer further includes a plurality of insulation portions received in the receiving spaces, respectively.

In certain embodiments, the insulation portions are formed after patterning of the electrode wires.

In certain embodiments, the film sensor further includes a protective layer formed between the metal nanowire layer and the optical adhesive layer.

In certain embodiments, the protective layer has a dielectric constant of less than 4 at a frequency of 100 KHz, and a water vapor transmission rate of less than 12 $g/m^2/day$ at a temperature of 38° C. and a relative humidity of 90%.

In certain embodiments, the protective layer has a thickness ranging from 0.2 μm to 10 μm.

In certain embodiments, adjacent two of the electrode wires are spaced part from each other by a distance ranging from 10 μm to 50 μm.

A touch display according to the disclosure includes a display module and the abovementioned film sensor that is integrated with the display module.

In certain embodiments, the touch display further includes an adhesive layer disposed between the display module and the film sensor, so as to permit the film sensor to be adhered to the display module through the adhesive layer.

In certain embodiments, the display module includes a plate member selected from the group consisting of a package substrate, a polarizer, or an electrode carrier, and the film sensor is adhered to the plate member of the display module.

In certain embodiments, the substrate of the film sensor is used as a substrate of the plate member.

In the film sensor according the disclosure, the optical adhesive layer is designed to be matched with the metal nanowire layer, such that a line resistance variation of the electrode wires is less than 10% and an insulation resistance between adjacent two of the electrode wires is greater than 300 MΩ under a weathering test conducted at a high temperature of 65° C., a high relative humidity of 90%, and a DC voltage of 5V for 240 hours. The reliability of the film sensor may be enhanced accordingly.

Referring to FIG. 1, an embodiment of a film sensor 1 according to the disclosure includes a substrate 11, a metal nanowire layer 12, and an optical adhesive layer 13.

The metal nanowire layer 12 is formed on the substrate 11, and includes a plurality of electrode wires 121 spaced apart from one another. Adjacent two of the electrode wires 121 are spaced part from each other by a distance (also known as a line space) ranging from 10 μm to 50 μm. For example, the distance can be 10 μm, 15 μm, 20 μm, 25 μm, 30 μm, or 50 μm.

The optical adhesive layer 13 is formed on the metal nanowire layer 12 to provide an adhesion function and to enhance reliability of the film sensor 1. Specifically, the optical adhesive layer 13 is matched with the metal nanowire layer 12, such that a line resistance variation of the electrode wires 121 is less than 10% and an insulation resistance between adjacent two of the electrode wires 121 is greater than 300 MΩ under a weathering test conducted at high temperature and high humidity (HTHH, i.e., at a high temperature of 65° C. and a high relative humidity of 90%) and at a DC voltage of 5V for 240 hours. In some embodiments, the line resistance variation of the electrode wires 121 is less than 10% and the insulation resistance between adjacent two of the electrode wires 121 is greater than 300 MΩ to inhibit short circuits from occurring between electrode wires 121.

Since metal ions in the metal nanowire layer 12 may migrate, the optical adhesive layer 13 should be configured to be matched with the metal nanowire layer 12 so as to effectively decrease the migration of the metal ions. Contrarily, migration of the metal ions will not occur in a sensor including a conventional conductive material (for example, ITO); thus, it is not envisioned that an optical adhesive should be provided specifically so as to be matched with a layer made of the conductive material when the sensor includes the conventional conductive material. The optical adhesive layer 13 matched with the metal nanowire layer 12 means that an optical adhesive selected for the optical adhesive layer 13 has properties that are matched with those of the metal nanowire material for the metal nanowire layer 12, so as to control water content to be maintained below an electrolysis threshold value of the metal ions, thereby effectively decreasing the migration of the metal ions. That is, the material of the optical adhesive layer 13 is selected based upon properties of the metal nanowire layer 12 (e.g., material of the metal nanowire layer 12, thickness of the metal nanowire layer 12, etc.) to inhibit metal ion migration and/or reduce the chance of forming a metal ion conduction path between electrode wires 121 and/or between the metal nanowire layer 12 and another electrically conductive layer when a direct current (DC) voltage bias electric field is created in and/or around the film sensor 1. In some embodiments, a dielectric effect and/or a water permeability of the material are considered when selecting the appropriate material for the optical adhesive layer 13.

In addition, the distance between adjacent two electrode wires 121 may also affect the probability of product function failure due to metal ion migration. The smaller the distance, the higher the probability of product function failure due to metal ion migration.

In certain embodiments, the optical adhesive layer 13 has a thickness ranging from 25 μm to 250 μm. In certain embodiments, the optical adhesive layer 13 has a thickness ranging from 50 μm to 150 μm.

The optical adhesive layer 13 may be made of an optical adhesive material selected from the group consisting of a non-ultraviolet curable acrylic adhesive material, a rubber adhesive material, or a combination thereof. The optical adhesive layer 13 made of the non-ultraviolet curable acrylic adhesive material has a dielectric constant of less than 4 (preferably less than 3) at a frequency of 100 KHz, a water absorption rate of less than 0.3% (preferably less than 0.25%), and a water vapor transmission rate (WVTR) of less than 400 $g/m^2/day$ at a temperature of 38° C. and a relative humidity of 90%. The optical adhesive layer 13 made of the rubber adhesive material has a dielectric constant of less than 4 (preferably less than 3) at a frequency of 100 KHz, a water absorption rate of less than 0.3% (preferably less than 0.25%), and a water vapor transmission rate of less than 100 $g/m^2/day$ at a temperature of 38° C. and a relative humidity of 90%.

In certain embodiments, the optical adhesive layer 13 is made of the rubber adhesive material.

In certain embodiments, the electrode wires 121 cooperatively define a plurality of receiving spaces thereamong, and the metal nanowire layer 12 further includes a plurality of insulation portions 122 received in the receiving spaces, respectively. The process for forming the metal nanowire layer 12 is further described below.

In certain embodiments, the metal nanowire layer 12 is formed by applying a metal nanowire-containing dispersion or slurry, followed by the steps of drying/curing, patterning, or the like. Examples of the applying step include, but are not limited to, screen printing, nozzle coating, and roll coating. In certain embodiments, a roll-to-roll process is used to apply the metal nanowire-containing dispersion or slurry on a surface of a continuously-supplied substrate.

The metal nanowire-containing dispersion may include a solvent, such as water, alcohols, ketones, ethers, hydrocarbons, or aromatics (for example, benzene, toluene, xylene, or the like).

The metal nanowire-containing dispersion may further include additives, surfactants, or adhesives, such as carboxymethyl cellulose (CMC), 2-hydroxyethyl cellulose (HEC), hydroxypropyl methylcellulose (HPMC) sulfonate, sulfate, disulfonate, sulfosuccinate, phosphate, fluorine-containing surfactants, or the like.

The metal nanowire layer 12 may be a silver nanowire layer, a gold nanowire layer, or a copper nanowire layer. Specifically, the metal nanowires used herein may include nanowires of a metal, nanowires of a metal alloy, or a combination thereof. The number of the metal nanowires in the metal nanowire layer 12 does not affect the protection scope claimed by the disclosure.

At least one cross-sectional dimension (i.e., a cross-sectional diameter) of a single metal nanowire is less than 500 nm, preferably less than 100 nm, and more preferably less than 50 nm. The metal nanostructures, known as "wires" in the disclosure, are mainly characterized by their high aspect ratio, for example, between 10 and 100,000. More specifically, the aspect ratio (length:cross-sectional diameter) of the metal nanowire may be greater than 10, preferably greater than 50, and more preferably greater than 100. The metal nanowires may be made of any metal. Examples of the metal may include, but are not limited to, silver, gold, copper, nickel, and/or gold-plated silver. Other terms, such as silk, fiber, tube (e.g., carbon nanotube), etc. are encompassed within the scope of the disclosure if they have the same dimension and the high aspect ratio as described above.

In certain embodiments, the metal nanowires may be silver nanowires or silver nanofibers, and may have an average diameter ranging from about 20 nm to about 100 nm and an average length ranging from about 20 μm to about 100 μm, preferably an average diameter ranging from about 20 nm to about 70 nm and an average length ranging from about 20 μm to about 70 μm (i.e., an aspect ratio of 1000). In certain embodiments, the metal nanowires may have an average diameter ranging from about 70 nm to about 80 nm and an average length of about 80 μm.

The drying/curing step mainly permits substances, such as a solvent or the like to be evaporated, so that the metal nanowires may be distributed randomly on the surface of the substrate. Preferably, the metal nanowires are adhered to the surface of the substrate without shedding so as to form the metal nanowire layer 12, and the metal nanowires may contact with one another to provide a continuous current path, thereby forming a conductive network.

In addition, the metal nanowire layer 12 may be further subjected to post-treatment so as to increase the conductivity thereof. The post-treatment may include processing steps such as heating treatment, plasma treatment, corona discharge treatment, ultraviolet/ozone treatment, and/or pressure treatment. For example, after the curing step to form the metal nanowire layer 12, a roller may be used to apply pressure thereon. In certain embodiments, a pressure ranging from 50 psi to 3400 psi, preferably from 100 psi to 1000 psi, and more preferably from 200 psi to 800 psi or from 300 psi to 500 psi, may be applied to the metal nanowire layer 12 using one or more rollers. In certain embodiments, heating treatment and pressure treatment may be implemented simultaneously for the post-treatment. Specifically, the metal nanowire layer 12 may be pressed using one or more rollers while heating. For example, the metal nanowire layer 12 may be applied with a pressure ranging from 10 psi to 500 psi, preferably from 40 psi to 100 psi, using the roller (s) while heating to a temperature ranging from 70° C. to 200° C., preferably from 100° C. to 175° C., so as to increase the conductivity of the metal nanowire layer 12. In certain embodiments, the metal nanowires in the metal nanowire layer 12 may be post-treated by exposing to a reducing agent. For example, when the metal nanowires are silver nanowires, the metal nanowire layer 12 may be post-treated by exposing to a silver-reducing agent. Examples of the silver-reducing agent include, but are not limited to, borohydrides (for example, sodium borohydride), boronitrides (for example, dimethyl amino borane), and/or gas reducing agents (for example, hydrogen ($H_2$) gas). The time period for the exposure may range from about 10 seconds to about 30 minutes, preferably from about 1 minute to about 10 minutes. The aforesaid pressing step may be implemented in a proper step according to the practical requirements.

The patterning step may be implemented by, for example, subjecting the metal nanowire layer 12 after curing, to exposing/developing (i.e., a well-known lithographic procedure) and etching. In certain embodiments, the metal nanowire layer 12 has the characteristics mentioned below.

Transmission of visible light (for example, at a wavelength ranging from about 400 nm to about 700 nm) may be greater than about 80%, and surface resistance may range from about 10 ohm/square to about 1000 ohm/square. In certain embodiments, the metal nanowire layer 12 may have the transmission of visible light (for example, at a wavelength ranging from about 400 nm to about 700 nm) of greater than about 85% and the surface resistance ranging from about 50 ohm/square to about 500 ohm/square.

In this embodiment, after the electrode wires 121 are formed by patterning, the insulation portions 122 are formed by applying a polymeric material among the electrode wires 121, followed by curing to form an overcoat (OC). Formation of the insulation portions 122 permits adjacent ones of the electrode wires 121 of the metal nanowire layer 12 to have better electrical insulation. Exemplary materials for the insulation portions 122 include, but are not limited to, polymethyl methacrylate, polyvinyl alcohol, polyethylene terephthalate, polynaphthalate, polycarbonate, polystyrene, polyvinyl toluene, polyvinyl xylene, polyimide, polyamide, polyamide-polyimide, polyetherimide, polysulfide, polysulfone, polyphenylene, polyphenylene ether, polyurethane, epoxy resin, polysilane, silicone, and/or silicon-containing poly(acrylic acid).

In certain embodiments, the material suitable for the substrate 11 includes a transparent material, for example, a flexible transparent material. Exemplary materials include, but are not limited to, polyethylene terephthalate (PET), polyimide (PI), polycarbonate (PC), polymethyl methacrylate (PMMA), polyvinyl chloride (PVC), polypropylene (PP), polyethylene naphthalate (PEN), polystyrene (PS), and/or cyclo-olefin polymers (COP).

In the embodiment, the film sensor 1 further includes a passivation layer 14, which is formed between the metal nanowire layer 12 and the optical adhesive layer 13. Specifically, the passivation layer 14 may be formed on a surface of the metal nanowire layer 12, followed by forming the optical adhesive layer 13 on a surface of the passivation layer 14, such that the passivation layer 14 is in direct contact with the metal nanowire layer 12 and the optical adhesive layer 13. In certain embodiments, an optical layer, a functional layer, or the like, may be further disposed between the passivation layer 14 and the metal nanowire layer 12 or between the passivation layer 14 and the optical adhesive layer 13 according to the required design.

In addition, the passivation layer 14 has characteristics of a dielectric constant of less than 4 (preferably less than 3) at a frequency of 100 KHz, and a water vapor transmission rate of less than 12 g/m²/day at a temperature of 38° C. and a relative humidity of 90%. The passivation layer 14 may have a thickness ranging from 0.2 μm to 10 μm. In certain embodiments, the thickness may range from 2.5 μm to 6.5 μm. A material suitable for the passivation layer 14 may be a dry film, a photoresist, an ink, or the like. In certain embodiments, the ink may be, for example, a curing insulation ink, and a curing temperature for the curing insulation ink is less than 110° C. The passivation layer 14 is designed to further block water vapor so as to further enhance the reliability of the film sensor 1 at an environment of high temperature and high humidity.

Samples were tested at an environment of high temperature and high humidity (i.e., at a temperature of 65° C. and a relative humidity of 90%) and a DC voltage of 5V, and the results thereof are shown in Table 1 below.

The sample of Example 1 has a configuration similar to the configuration illustrated in FIG. 1, except that the passivation layer 14 is not included.

The sample of Example 2 has a configuration illustrated in FIG. 1, in which the optical adhesive layer 13 and the passivation layer 14 are included.

The sample of Comparative Example 1 has a configuration similar to the configuration illustrated in FIG. 1, except that the optical adhesive layer 13 and the passivation layer 14 are not included.

The sample of Comparative Example 2 has a configuration similar to the configuration illustrated in FIG. 1, except that the optical adhesive layer 13 is not included.

TABLE 1

|  | Test period (hours) | Electrical result |
|---|---|---|
| Example 1 | 240 | Normal |
| Example 2 | 500 | Normal |
| Comparative Example 1 | 12 | Failure |
| Comparative Example 2 | 72 | Failure |

The results in Table 1 show that the samples of Examples 1 and 2, in which the optical adhesive layer 13 is included, have significantly better reliability at an environment of high temperature and high pressure, compared to that of the samples of Comparative Examples 1 and 2, in which the optical adhesive layer 13 is not included. That is, in the film sensor 1 of the disclosure, the optical adhesive layer 13 is designed to effectively enhance reliability. In addition, as seen from the result of Example 2, the reliability of the film sensor 1 may be further enhanced by including both the optical adhesive layer 13 and the passivation layer 14 therein.

Figure 2:
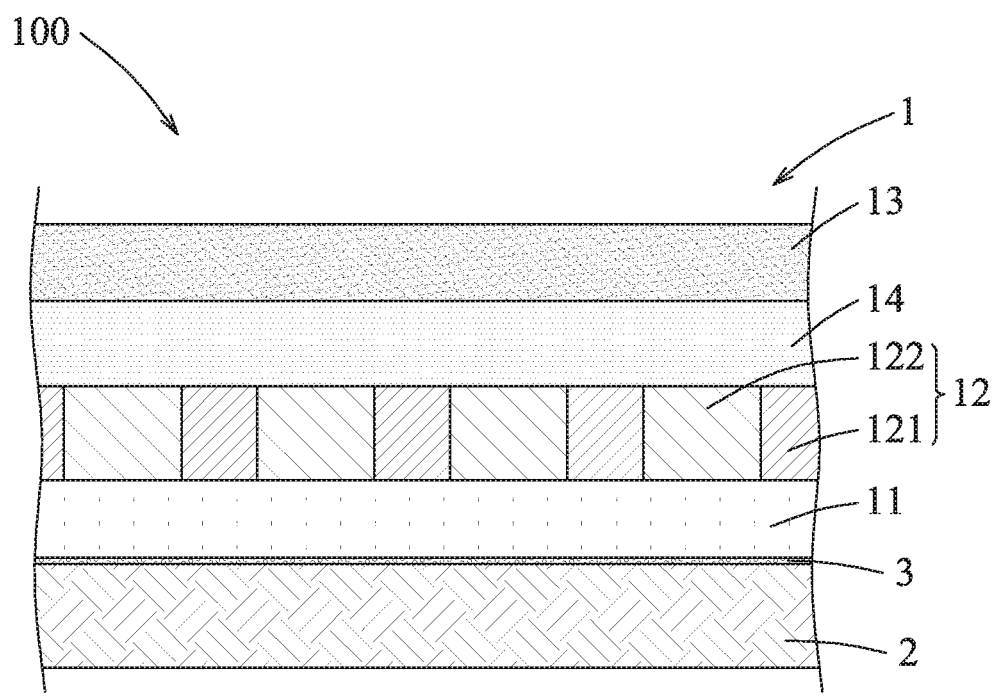
FIG. 2 is a fragmentary schematic sectional view of an embodiment of a touch display according to the disclosure.

Referring to FIG. 2, a touch display 100 includes the film sensor 1 as described above, a display module 2, and an adhesive layer 3. The display module 2 may be, for example, an organic light-emitting diode (OLED) module, a liquid crystal display (LCD) module, or the like. In addition, since the metal nanowire layer 12, which has superior flexibility, is used as a touch electrode in the film sensor 1 of the disclosure, a flexible display module may be used as the display module 2 so as to provide the touch display 100 with a foldable effect. The adhesive layer 3 is disposed between the display module 2 and the film sensor 1.

The film sensor 1 of the disclosure is integrated with the display module 2. Specifically, the film sensor 1 is disposed on the display module 2, and is adhered to the display module 2 through the adhesive layer 3. The film sensor 1 may be adhered to a plate member, for example, but not limited to, a package substrate, a polarizer, or an electrode carrier, of the display module 2. In certain embodiments, in order to achieve an miniaturization effect, the substrate 11 of the film sensor 1 may be used directly as a substrate of the plate member of the display module 2, so as to permit the metal nanowire layer 12 of the film sensor 1 to be formed on a surface of the plate member of the display module 2.

In view of the aforesaid, in the film sensor 1 of the disclosure, the optical adhesive layer 13 is designed to be matched with the metal nanowire layer 12, such that a line resistance variation of the electrode wires 121 is less than 10% and an insulation resistance between adjacent two of the electrode wires 121 is greater than 300 MΩ under a weathering test conducted at a high temperature of 65° C., a high relative humidity of 90%, and a DC voltage of 5V for 240 hours, thereby enhancing the reliability of the film sensor 1.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A film sensor, comprising:
   a substrate;
   a metal nanowire layer disposed on said substrate, wherein said metal nanowire layer comprises a plurality of electrode wires spaced apart from one another; and
   an optical adhesive layer disposed on said metal nanowire layer, wherein said optical adhesive layer is matched with said metal nanowire layer, such that a line resistance variation of said plurality of electrode wires is less than 10% and an insulation resistance between adjacent two of said plurality of electrode wires is greater than 300 MΩ under a weathering test conducted at a temperature of 65° C., a relative humidity of 90%, and a DC voltage of 5V for 240 hours.

2. The film sensor according to claim 1, wherein:
   said optical adhesive layer is made of an optical adhesive material selected from the group consisting of a non-ultraviolet curable acrylic adhesive material, a rubber adhesive material, or a combination thereof,
   said optical adhesive layer made of said non-ultraviolet curable acrylic adhesive material has a dielectric constant of less than 4 at a frequency of 100 KHz, a water absorption rate of less than 0.3%, and a water vapor transmission rate of less than 400 g/m$^2$/day at a temperature 38° C. and a relative humidity of 90%, and
   said optical adhesive layer made of said rubber adhesive material has a dielectric constant of less than 4 at a frequency of 100 KHz, a water absorption rate of less than 0.3%, and a water vapor transmission rate of less than 100 g/m$^2$/day at a temperature of 38° C. and a relative humidity of 90%.

3. The film sensor according to claim 2, wherein said optical adhesive layer has a thickness ranging from 25 μm to 250 μm.

4. The film sensor according to claim 1, wherein:
said plurality of electrode wires cooperatively define a plurality of receiving spaces thereamong, and
said metal nanowire layer further comprises a plurality of insulation portions disposed in said plurality of receiving spaces, respectively.

5. The film sensor according to claim 4, wherein said plurality of insulation portions are formed after said plurality of electrode wires are formed by patterning.

6. The film sensor according to claim 1, further comprising a passivation layer disposed between said metal nanowire layer and said optical adhesive layer.

7. The film sensor according to claim 6, wherein said passivation layer has a dielectric constant of less than 4 at a frequency of 100 KHz, and a water vapor transmission rate of less than 12 g/m$^2$/day at a temperature of 38° C. and a relative humidity of 90%.

8. The film sensor according to claim 6, wherein said passivation layer has a thickness ranging from 0.2 μm to 10 μm.

9. The film sensor according to claim 1, wherein said adjacent two of said plurality of electrode wires are spaced part from each other by a distance ranging from 10 μm to 50 μm.

10. A touch display, comprising:
a display module, and
the film sensor according to claim 1 integrated with said display module.

11. The touch display according to claim 10, further comprising an adhesive layer disposed between said display module and said film sensor, so as to permit said film sensor to be adhered to said display module through said adhesive layer.

12. The touch display according to claim 11, wherein said display module comprises a plate member selected from the group consisting of a package substrate, a polarizer, or an electrode carrier, and said film sensor is adhered to said plate member of said display module.

13. The touch display according to claim 12, wherein said substrate of said film sensor is used as a substrate of said plate member.

* * * * *